INVENTOR
J. N. MORAN
BY
Young and Quigg
ATTORNEYS

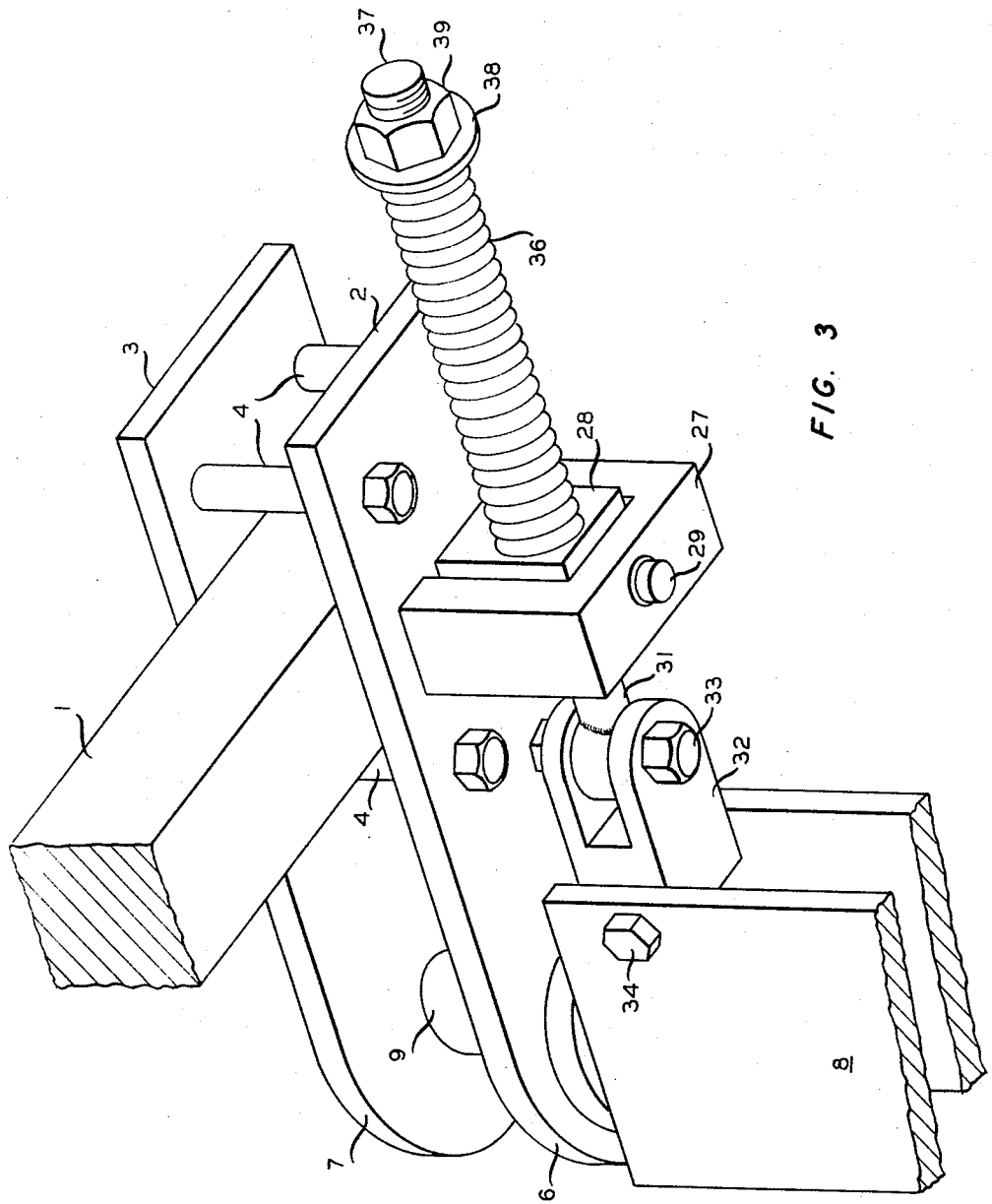

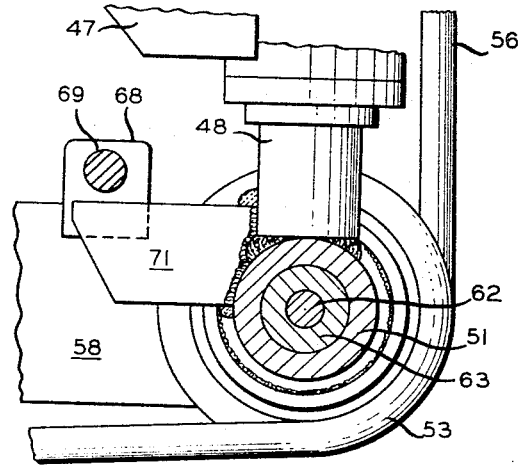
FIG. 6
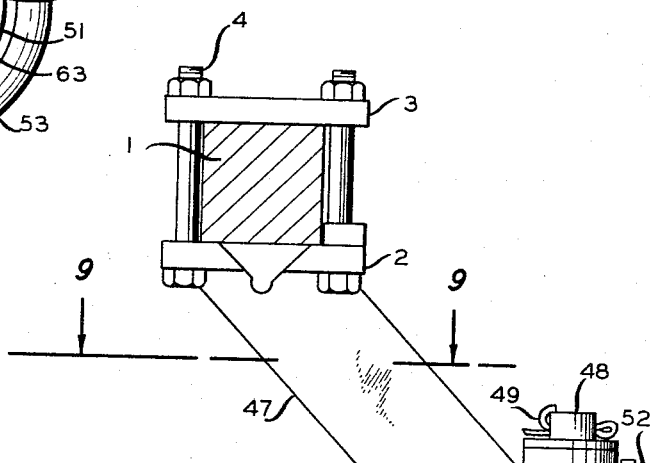
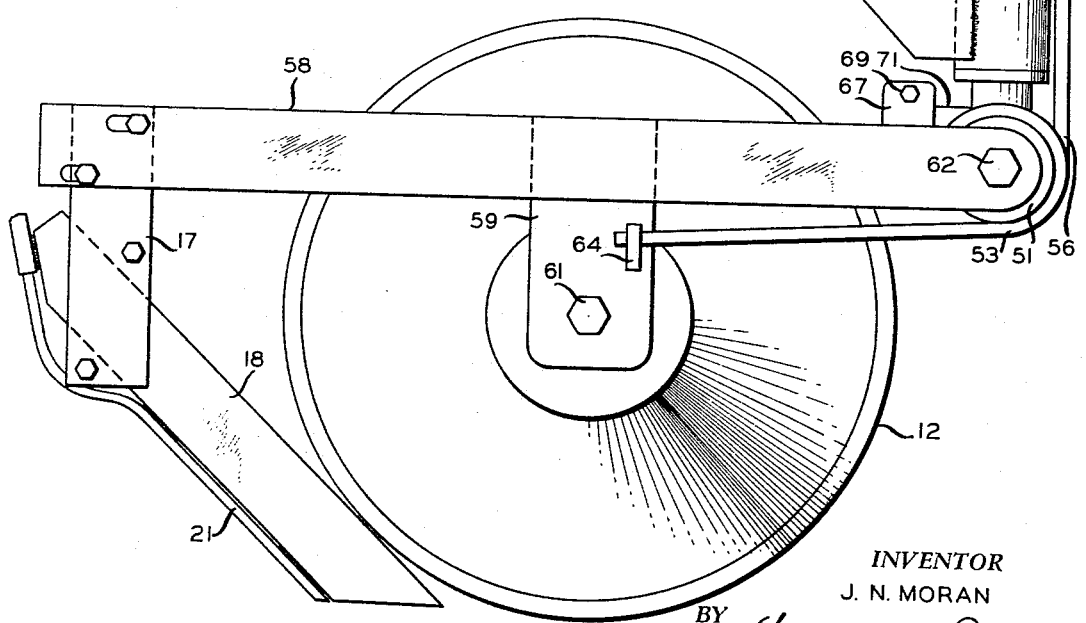
FIG. 4
INVENTOR
J. N. MORAN
BY Young and Quigg
ATTORNEYS

United States Patent Office 3,319,589
Patented May 16, 1967

3,319,589
APPARATUS FOR SUPPLYING FERTILIZER
TO THE SOIL
Jesse N. Moran, Bartlesville, Okla., assignor to Phillips
Petroleum Company, a corporation of Delaware
Filed Aug. 2, 1965, Ser. No. 476,530
8 Claims. (Cl. 111—7)

This invention relates to equipment for supplying fertilizer to the soil. In one aspect, this invention relates to fertilizer applicator assemblies which are carried by an applicator vehicle for the purpose of introducing a fertilizer into the soil. In another aspect, this invention relates to fertilizer applicator assemblies which serve to supply a fluid fertilizer to the soil.

In general, the fertilizing equipment employed in the agriculture industry comprises a vehicle having a colter or a chisel for making an opening in the soil, a fertilizer dispenser such as a nozzle positioned to deposit fertilizer into the opening in the soil, and a packer wheel mounted in trailing relationship with the dispenser for closing the opening in the soil after the fertilizer has been deposited therein. With the advent of liquid fertilizers being applied in large amounts to large tracts of land, the fertilizing equipment has become more sophisticated in character with a view toward increasing the speed and efficiency of the operation. Although the chisel-type applicator assembly is suitable for opening the soil so that the fertilizer can be received, this type of applicator is undesirable mainly because of the damaging effect it has on the roots of young tender plants. The colter-type applicator assembly for opening the soil is less desirable than the chisel-type because in many cases it is necessary to attach the fertilizer dispensing nozzle as a separate unit thus making the applicator vehicle cumbersome and difficult to transport. Another serious disadvantage associated with the colter applicator assemblies is the manner in which they are attached to the tool bar of the fertilizer vehicle. When the tool bar is rotated for the purpose of lifting the several colter applicator assemblies out of the soil, the individual colters tend to seek their lowermost level by rotating downward. This causes the applicator assemblies to bang and rub against each other with the net result that they can become seriously damaged and tangled or locked together. It is evident that when the applicator assemblies are mounted in this manner and the fertilizer vehicle is used on a small tract of land, a considerable amount of time is lost in straightening and aligning the applicators because of the large number of turns which must be executed in order to complete the fertilizing operation.

According to this invention, these and other disadvantages of the prior art fertilizer applicator assemblies are overcome by means of an applicator assembly comprising in combination a disk-type rotatable colter for cutting a furrow in the soil, a clamp adapted to be attached to the tool bar of a fertilizer applicator vehicle, horizontal pivot means connecting the clamp and a portion of the applicator assembly for maintaining the assembly in a predetermined horizontal position, vertical pivot means connecting the horizontal pivot means and the colter for maintaining the colter in a predetermined vertical position, and an injection knife including a nozzle connected to the vertical pivot means and carried behind the colter for injecting fertilizer into the furrow formed by the colter. In the three embodiments of the invention which are herein disclosed for illustrative purposes, the horizontal pivot means includes a housing connected to the clamp and a spring-biased shaft carried within the housing. The kinetic energy of the spring serves to apply a force to the shaft which will maintain the shaft in a predetermined position. The shaft is positioned to maintain the colter in a trailing relationship with respect to the fertilizer applicator vehicle. Any side force on the colter will be against the action of the spring such that the spring will serve to urge the colter back into trailing position. Thus, the horizontal pivot means will maintain the colter in trailing position against a side load on the colter which could result from passing over a rock or brush pile in the soil. The spring and the horizontal pivot means will also serve to maintain the colter in trailing relationship when the tool bar has been rotated for the purpose of lifting the applicator assembly out of the soil. This feature is particularly advantageous when a large number of turns must be made such as could occur in working on a small tract of land.

The vertical pivot means in the fertilizer applicator assembly of this invention includes a spring member which functions to apply a force on the colter to maintain the colter in a predetermined vertical position. In one embodiment of the invention, the springs of the vertical pivot means operate on strap members attached to the colter. In another embodiment of the invention, the spring means of the vertical pivot means operates more directly on the colter in the sense that the force obtained by the spring does not act through a pivot. In still another embodiment of the invention, the injection knife including the fertilizer dispensing nozzle is connected to the colter and the vertical pivot means in a manner which maintains the relative position of the injection knife and the colter constant at all times. In all embodiments of the invention, the vertical pivot means serves to return the colter and the injection knife to its predetermined position by means of the kinetic energy of the spring means. Thus, any vertical force such as that caused by a rock or the like in the soil against the colter or the injection knife which tends to raise them out of the soil will be against the force of the spring means with the result that the colter and the injection knife will be returned to their predetermined position.

Accordingly, it is an object of this invention to provide an improved fertilizer applicator assembly.

Another object of this invention is to provide a fertilizer applicator assembly which can be maintained in a predetermined vertical and a predetermined horizontal position at all times.

A further object of this invention is to provide a fertilizer applicator assembly which combines the soil opening means and the fertilizer dispensing means such that the assembly minimizes damage to the roots of growing plants.

Still another object of this invention is to provide a fertilizer applicator assembly which can be lifted or rotated out of the soil and yet remain in trailing relationship to the vehicle supporting the assembly.

A still further object of this invention is to provide a fertilizer applicator assembly wherein the means for opening the soil and the means for dispensing the fertilizer remain in a constant relationship at all times.

Still another object of this invention is to prevent the fertilizer applicator assemblies in an applicator vehicle from becoming damaged or tangled and locked together as a result of the assembly being lifted out of the soil in order to execute a turn with the applicator vehicle.

These and other objects of the invention will become apparent to one skilled in the art after studying the following detailed description, the appended claims, and the accompanying drawings wherein:

FIGURE 3 is an isometric view of the horizontal pivot means of the fertilizer applicator assembly of the embodiment illustrated in FIGURES 1 and 2;

FIGURE 4 is a side elevation of a fertilizer applicator assembly in accordance with another embodiment of the invention;

FIGURE 6 is a cross-section of a portion of the applicator assemblies illustrating the horizontal pivot means and the vertical pivot means in accordance with one embodiment of the invention;

Figure 1:
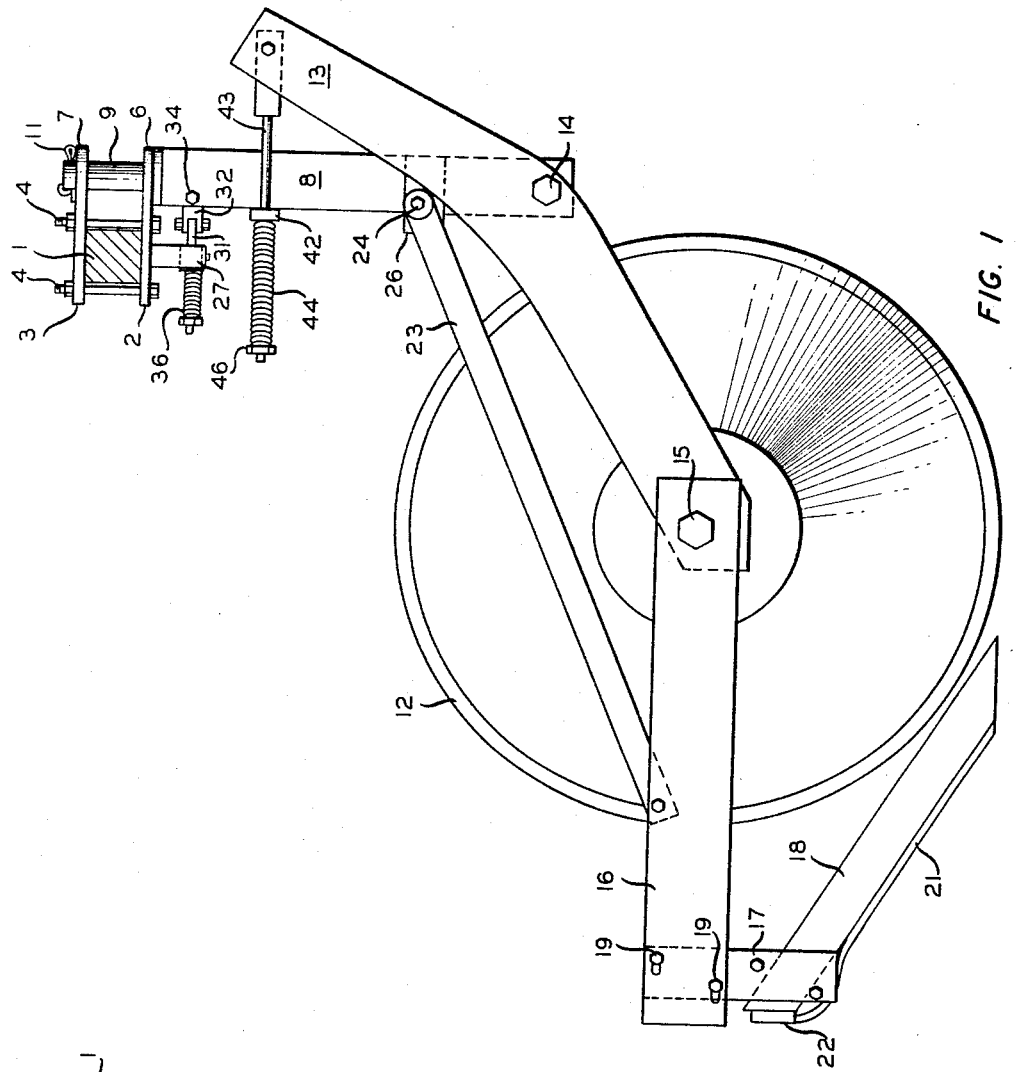
FIGURE 1 is a side elevation of a fertilizer applicator assembly in accordance with one embodiment of the invention.

Before the several illustrated embodiments of the invention are described in detail, it should be understood that the applicator assemblies of this invention can be used for distributing or injecting such fertilizer materials as anhydrous ammonia, aqua ammonia, other nitrogen-containing solutions such as aqueous ammonium sulfate, aqueous ammonium nitrate, aqueous ammonium phosphate, mixtures of two or more of the foregoing, soil fumigants, and soil conditioners. It should also be understood that the terms "fluid" or "fluid fertilizer" as used herein are intended to mean any readily flowable fertilizer or soil improver which can be in liquid, solid, or gaseous form.

Referring now to the drawings, wherein like reference numerals are used to denote like elements, and particularly to FIGURES 1, 2, and 3, one embodiment of the invention will be described in detail. A conventional fertilizer applicator vehicle (not shown) is provided with a tool bar 1 which extends transverse to the direction of travel. A clamp comprising a lower plate member 2 and an upper plate member 3 is rigidly attached to tool bar 1 by a plurality of bolts 4. The horizontal pivot means of this invention includes a housing in the form of two plates 6 and 7 attached to plates 2 and 3, respectively. A shaft 8 is provided with an upper cylindrical end 9 passing through circular openings in the plates 6 and 7. The shaft 8 is maintained in the housing by means of a cotter pin 11 or the like passing transversely through the upper end 9.

A disk-type colter 12 is mounted for rotation between a first pair of spaced strap members 13, each of which is pivotally connected to opposite sides of the lower end of shaft 8 by means of a bolt 14. A second pair of spaced strap members 16 is attached to the colter 12 by means of a bolt 15. A strap member 17 depending from strap members 16 will serve to support an injection knife 18 by means of a plurality of bolts 19. The injection knife 18 is provided with a dispensing nozzle 21 in the form of a tube which extends along the trailing edge of the knife 18. The upper end of the dispensing nozzle is provided with a coupling 22 which can be attached to the fertilizer/distributing system (not shown).

A third pair of strap members 23, one of which is connected to one of the strap members 16 and the other of which is connected to the other of strap members 16, is connected to the lower end of shaft 8 by means of a bolt 24 extending through a flange 26.

The horizontal pivot means in this embodiment of the applicator assembly includes shaft 8 and plates 6 and 7 which make up the housing. The housing and shaft are mounted to allow the shaft to be rotated within the housing about a substantially vertical axis disposed longitudinally with the shaft. Also included within the horizontal pivot means is a U-shaped housing 27 connected to plate 2 of the clamp at the free end of each leg of the U-shaped housing to form an opening through which a block 28 can be pivotally mounted about a vertical axis by means of rod 29 which extends through the U-shaped clamp 27. The block 28 is provided with an opening extending transverse to the rod 29. A rod 31 is slidably positioned within the opening in block 28 and is pivotally connected to union 32 by means of bolt 33. The union 32 in turn is pivotally connected to shaft 8 by means of bolt 34.

A spring 36 is slidably mounted over the free end of rod 31 in abutment with block 28. The rod 31 is provided with threads 37 at its free end to accommodate a washer 38 and a nut 39 for placing spring 36 under compression.

In describing the function of the horizontal pivot means in accordance with this embodiment of the invention it is apparent that as a side load or the like is applied to colter 12, shaft 8 will tend to rotate within plates 6 and 7 of the housing. Since the rotation of shaft 8 will cause union 32 to change position, and since such a change in position of union 32 will draw rod 31 through the opening in block 28 thereby increasing the compression on spring 36, the kinetic energy of spring 36 will tend to return the rod 31 to its normal position. This will have the effect of returning shaft 8 to its normal position thereby placing the colter 12 in trailing relationship. The nut 39 can be adjusted to place the desired compression on the spring 36 by simply advancing it on shaft 31.

The vertical pivot means of this embodiment of the invention includes the first pair of spaced strap members 13, one of which is pivotally connected to one side of shaft 8 by means of bolt 14 and the other of which is pivotally connected to the other side of shaft 8 by means of bolt 14 and both of which are connected at their lower ends to colter 12 by means of bolt 15. The vertical pivot means of this embodiment also includes the second pair of spaced strap members 16, strap 17, and the third pair of spaced strap members 23 connecting each of the second pair of spaced strap members 16 to shaft 8.

Further included in the vertical pivot means is a block 42 having a pair of openings for receiving a pair of rods 43. One of the rods 43 is slidably mounted through one of the openings in block 42 and is pivotally connected to the upper end of one of the straps in the first pair of strap members 13 and the other rod is slidably mounted through one of the other openings in rod 42 and is pivotally connected to the other strap in the first pair of strap members 13. A pair of springs 44, one of which is slidably mounted over the free end of one of the rods 43 and the other of which is slidably mounted over the free end of the other rod, is placed in abutment with block 42. Means including a pair of nuts 46 is connected to each of the rods 43 for the purpose of adjusting the compression in each of the springs 44.

In describing the function of the vertical pivot means in accordance with this embodiment of the invention, when the colter 12 or the lower end of the injection knife 18 strikes a substantially immovable object in the soil such as a rock or the like the vertical pivot means including the colter and the strap members will jump upward thereby increasing the space between the upper end of the strap members 13 and the block 42 due to the pivot connection about bolt 14. This will have the effect of increasing the compressive forces on springs 44 such that they tend to urge the rods 43 and the remainder of the vertical pivot means to return to its normal predetermined position. Since the springs 44 are provided with adjusting means which can be used for adjusting the compression, the resistance which must be overcome to lift the colter and pivot the vertical assembly about the horizontal axis through bolt 14 can be adjusted.

Figure 2:
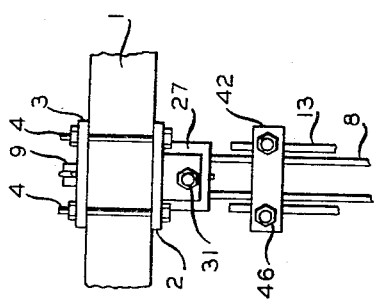
FIGURE 2 is a rear elevation of the embodiment illustrated by FIGURE 1.
Figure 5:
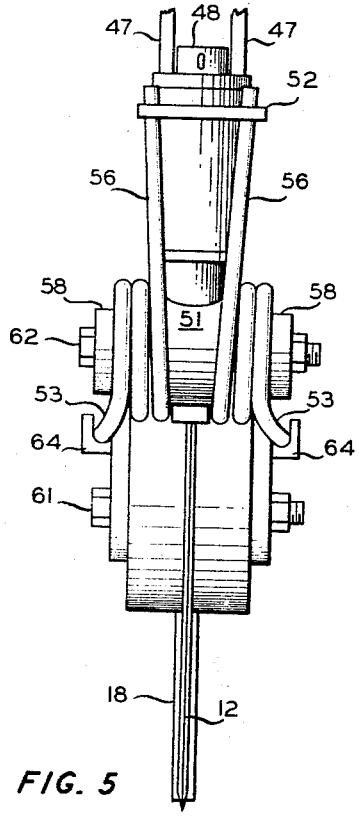
FIGURE 5 is a front elevation of the fertilizer applicator assembly illustrated in FIGURE 4.

It is within the spirit and scope of the invention to depart from the actual structure illustrated in FIGURES 1, 2, and 3 in order to maintain the relative position of the injection knife 18 and the colter 12 constant at all times. This can be accomplished by extending the flange 26 rearward from the shaft 8 a distance which will allow the third pair of strap members 23 to be attached by bolt 24 such that each of the strap members 23 is parallel to each of the strap members 13. This parallelogram relationship of the strap members and flange 26 will result in the colter 12 and injection knife 18 moving the same distance in response to any vertical movement of either the colter or the injector knife.

Referring now to FIGURES 4, 5, 6, and 9 of the drawings, which illustrate another embodiment of the invention, the clamp including the plates 2 and 3 is attached to the tool bar 1 by means of bolts 4. A housing 47 is connected to plate 2 of the clamp and serves to house a substantially vertical shaft 48. The shaft 48 is maintained in position within the housing by means of a cotter pin 49 and can be rotated within housing 47 about its vertical axis.

The horizontal pivot means of the fertilizer applicator assembly of this embodiment of the invention includes a second shaft 51 attached to shaft 48 and positioned to extend in opposite directions therefrom. The second shaft 51 can be secured to the shaft 48 as by welding or the like.

A flange 52 connected to housing 47 as by welding or the like is provided with a pair of openings. A helical spring means includes a first helical spring 53 positioned over one end of the second shaft 51 and a second helical spring 54 positioned over the opposite end of the second shaft 51. Extensions 56 and 57 from helical springs 53 and 54, respectively, pass upward through the openings in flange 52.

In the function of the horizontal pivot means of this embodiment of the invention, it is apparent that when a side load is applied to the colter 12 the longitudinal axis of the helical springs 53 and 54 will become oblique thereby transmitting a force through the extensions 56 and 57 to flange 52. This will have the effect of disrupting the normal position of the helical spring 53 such that it will tend to rotate shaft 48 to its normal position with respect to housing 47.

The vertical pivot means of the embodiment illustrated by FIGURES 4, 5, 6, and 9 of the drawings includes a pair of spaced strap members 58 which includes a pair of spaced dependent strap members 59 extending to colter 12. The colter 12 is attached to the strap members 59 by means of a bolt 61. One of the spaced strap members 58 is pivotally attached at one end to one end of the second shaft 51 and the other spaced strap member 58 is pivotally attached to the other end of the second shaft 51. Both of the strap members 58 are secured by means of a bolt 62 which extends lengthwise with the second shaft 51. A bushing 63 constructed of brass or the like is preferably positioned between bolt 62 and shaft 51.

The injection knife 18 including strap member 17 is attached to the ends of the spaced strap members 58 such that the dispensing nozzle 21 is positioned near the bottom of colter 12. A pair of flanges 64 and 66 is each carried by one of the strap members 59. Helical springs 53 and 54 are in engagement with flanges 64 and 66, respectively, for the purpose of maintaining the necessary vertical force on the vertical pivot means including the colter and the injection knife.

A pair of lugs 67 and 68 is attached as by welding or the like to the upper edges of each of the strap members 58. A bolt 69 extending between the lug members 67 and 68 will serve to engage the upper surface of a flange 71 secured to shafts 48 and 51. This will prevent the helical springs from forcing the colter and the injection knife below the desired horizontal position.

In describing the function of the vertical pivot means in accordance with this embodiment of the invention, when the colter or the injection knife strikes a comparatively hard object in the soil the vertical pivot means including the colter will tend to rotate upward about a horizontal axis cojugate with bolt 62. Since this action will cause the helical springs to become more compressed, and since this compression will place a downward force on the colter through the medium of strap members 59, the vertical pivot means will tend to maintain the colter and the injection knife in a predetermined vertical position.

Figure 8:
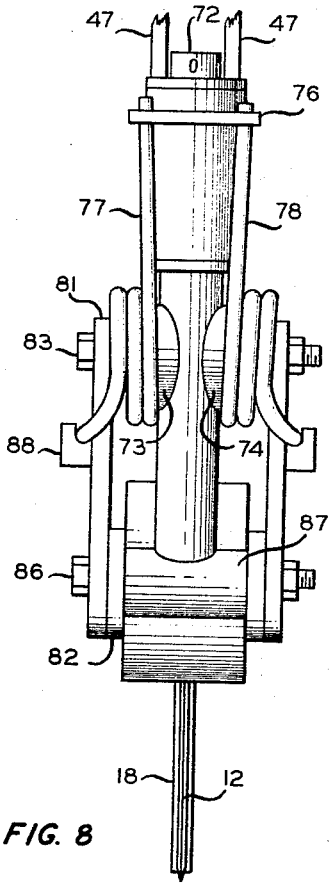
FIGURE 8 is a front elevation of the embodiment illustrated in FIGURE 5.
Figure 9:
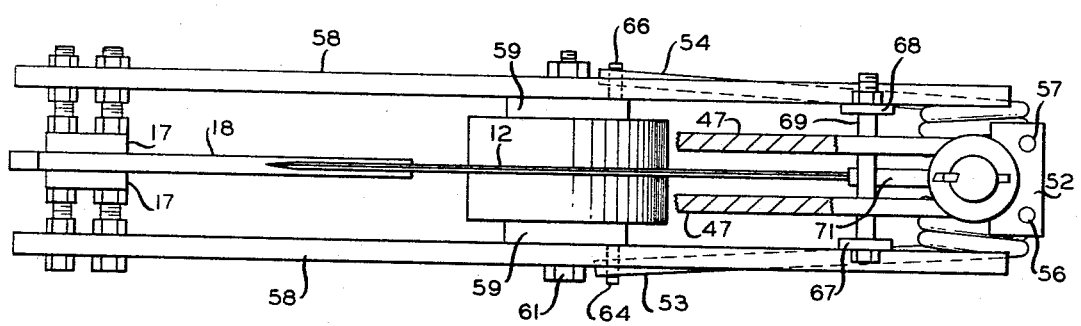
FIGURE 9 is a top view of the fertilizer applicator assembly of FIGURE 4.
Figure 7:
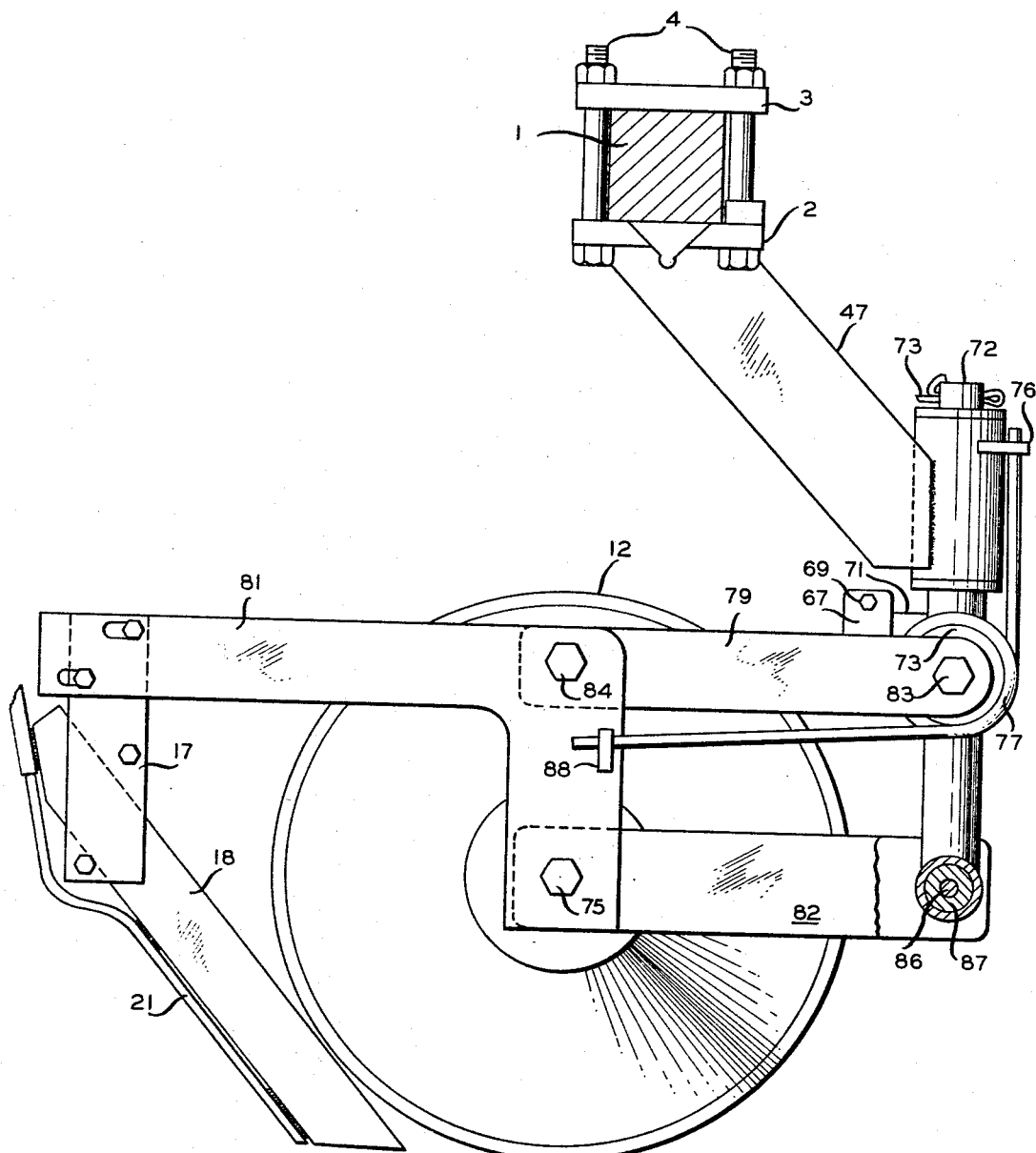
FIGURE 7 is a side elevation of a fertilizer applicator assembly in accordance with still another embodiment of the invention.

Referring now to FIGURES 7 and 8 of the drawings, which illustrate another embodiment of the invention, the clamp including the upper and lower plates 2 and 3 is rigidly attached to the tool bar 1 by means of bolts 4. The housing 47 is attached to plate 2 and serves to define an opening for vertical shaft 72. The vertical shaft 72 is maintained within housing 47 by means of a cotter pin 73.

The horizontal pivot means of this embodiment of the invention includes housing 47, shaft 72, a first shaft 73 attached at substantially a right angle to shaft 72, and a second shaft 74 attached at substantially a right angle to shaft 72 and on the opposite side thereof with respect to shaft 73. A flange 76 attached to housing 47 is provided with a pair of openings. Helical spring means comprising a first spring 77 and a second spring 78 are positioned over shafts 73 and 74, respectively. An extension from each of the springs 77 and 78 extends upward through the openings in flange 76.

The horizontal pivot means of this embodiment of the invention functions in essentially the same manner as the horizontal pivot means of the embodiment illustrated by FIGURES 4, 5, 6, and 9 of the drawings. When a side load is applied to colter 12 or injection knife 18, the energy stored in that portion of the helical springs 77 and 78 positioned over shafts 72 and 73 and passing through flange 76 will tend to return the colter, injection knife, and the horizontal pivot means to its predetermined horizontal position.

The vertical pivot means of the embodiment of the invention illustrated by FIGURES 7 and 8 of the drawings includes a first pair of spaced strap members 79, one of which is pivotally attached at one end to the outer end of shaft 73 and the other of which is pivotally attached at one end of the outer end of shaft 74. A second pair of generally L-shaped strap members 81 is provided for connecting the strap member 17 and injector knife 18 to the applicator assembly. One of the L-shaped strap members 81 is pivotally attached to one of the first pair of strap members 79, colter 12, and strap member 17. The other L-shaped strap member 81 is pivotally attached to the other of said first pair of strap members 79, colter 12, and strap member 17. A third pair of spaced strap members 82 is provided for connecting the colter to the shaft 72 carried by housing 47. One of the third pair of spaced strap members 82 is pivotally attached at one end to shaft 72 and the other strap member 82 is pivotally attached at one end to shaft 72. Both of the strap members 82 are connected at their other ends to colter 12 by means of bolt 75. The first pair of spaced strap members 79 is attached to shafts 73 and 74 by means of a bolt 83 which extends lengthwise through shafts 73 and 74. The second pair of generally L-shaped strap members 81 is each connected to each of said first pair of spaced strap members 79 by means of bolt 84. The third pair of spaced strap members 82 is each pivotally attached to shaft 72 by means of a bolt 86. A bushing 87 is positioned over the bolt 86 in contact with the interior of shaft 72. Strap members 79 and 82 are parallel at all times and one leg of each of the L-shaped strap members 81 is parallel with shaft 72 regardless of the position of colter 12 or injection knife 18.

A pair of flanges 88, one of which is carried by one of the L-shaped strap members 81 and the other of which is carried by the other L-shaped strap member, receives the ends of the helical springs 77 and 78.

The lugs 67 are attached to the upper sides of the strap members 79 and are provided with a bolt 69 therebetween in the same manner as that illustrated and described in connection with the embodiment illustrated by FIGURES 4, 5, 6, and 9 of the drawings. The flange 71 will serve as a stop for bolt 69 when the colter and the injection knife are in their normal operation position.

In describing the function of the vertical pivot means in accordance with this embodiment of the invention, when the colter 12 or the injection knife 18 strikes an object in the soil which causes the applicator assembly to be lifted, the parallelogram relationship of the strap members 79 and 82 and the strap members 81 and shaft 72 will prevent any relative change in position between the injection knife 18 and the colter 12. This result is achieved because the vertical portion of the L-shaped strap members 71 and shaft 72 remains parallel at all times. Moreover, the strap members 79 remain parallel with strap members 82 at al ltimes.

The feature of preventing any relative change in the position between the bottom tip of the injection knife 18 and the colter 12 is extremely desirable in a fertilizer applicator assembly of this type because by introducing the fertilizer directly into the soil none is lost to atmosphere thus resulting in a more uniform application.

It is obvious that several modifications can be made in the applicator assembly herein described without departing from the novel concept thereof. For example, it is within the spirit and scope of this invention to employ a single helical spring for maintaining the applicator assembly in its predetermined horizontal and predetermined vertical position rather than two separate helical springs. This could be accomplished by merely fastening or connecting the upper ends of the two helical springs together. Another modification which could be readily made without departing from the invention pertains to the clamps for attaching the applicator assembly to the tool bar of a fertilizer vehicle. For example, it is possible to change the clamp means such that it will accommodate a circular or octagonal-shaped tool bar.

Although the invention has been described in considerable detail, it must be understood that such detail is for that purpose only and that many variations and modifications can be made without departing from the spirit and scope thereof.

I claim:

1. A fertilizer applicator assembly for supplying fertilizer to the soil comprising in combination a disk-type rotatable colter for cutting a furrow in the soil in response to rotational movement of said colter; a clamp adapted to be rigidly attached to the tool bar of a fertilizer applicator vehicle; horizonal pivot means including a housing connected to said clamp and a shaft in said housing, said housing and said shaft being mounted to allow said shaft to be rotated in said housing about a substantially vertical axis disposed longitudinally with said shaft; vertical pivot means connected to said horizontal pivot means and sail colter to allow said vertical pivot means and said colter to be moved in a vertical plane about a horizontal axis; and an injection knife connected to said vertical pivot means and depending therefrom for allowing fertilizer to be injected into the furrow formed by said colter.

2. A fertilizer applicator assembly according to claim 1 wherein said horizontal pivot means includes a U-shaped housing connected to said clamp at the free end of each leg of said U-shaped housing; a block having an opening therethrough, said block being pivotally mounted within said U-shaped housing such that the opening therein coincides with the space between the legs in said U-shaped block; a rod slidably positioned in the opening in said block and pivotally connected at one end to said shaft in said horizontal pivot means; a spring slidably mounted over the free end of said rod in abutment with said block; and means carried by the free end of said rod for adjusting the compression in said spring to maintain said horizontal pivot means in a predetermined horizontal position.

3. A fertilizer applicator assembly according to claim 2 wherein said vertical pivot means includes a first pair of spaced strap members one of which is pivotally connected to one side of said shaft in said horizontal pivot means and the other of which is pivotally connected to the other side of said shaft in said horizontal pivot means and both of which are connected at their lower ends to said colter and both of which have their upper ends spaced from said shaft; a second pair of spaced strap members connected to said colter and to said injection knife; a third pair of spaced strap members one of which is connected to one of the strap members in said second pair of spaced strap members and the other of which is connected to the other of the strap members in said second pair of spaced strap members and both of which are connected to said shaft to maintain said injection knife and said second pair of spaced strap members in a predetermined relationship with said horizontal pivot means; a block connected to said shaft, said block having a pair of openings therein; a pair of rods one of which is slidably positioned through one of the openings in said block and pivotally connected to the upper end of one of the straps in said first pair of strap members and the other of which is slidably positioned through the other opening in said block and pivotally connected to the upper end of the other strap in said first pair of strap members; a pair of springs one of which is slidably mounted over the free end of one of said rods and the other of which is slidably mounted over the free end of the other of said rods and both of which are in abutment with said block; and means carried by the free ends of each of said rods for adjusting the compression in each of said springs to maintain said colter in a predetermined vertical position.

4. A fertilizer applicator assembly according to claim 1 wherein said horizontal pivot means includes a second shaft attached to and extending in opposite directions from said shaft in said housing, each of the ends of said second shaft being spaced from said shaft in said housing; a flange connected to said housing, said flange having a pair of openings; and helical spring means carried by said second shaft and extending through the openings in said flange for maintaining said horizontal pivot means in a predetermined horizontal position.

5. A fertilizer applicator assembly according to claim 4 wherein said vertical pivot means includes a pair of spaced strap members for supporting said colter one of which is pivotally attached at one end to one end of said second shaft and the other of which is pivotally attached at one end to the other end of said second shaft and both of which are connected at their other ends to said injection knife; and a pair of flanges one of which is carried by one of said strap members and the other of which is carried by the other of said strap members and both of which are in engagement with said helical spring means for maintaining said spaced strap members, said injection knife, and said colter in a predetermined vertical position.

6. A fertilizer applicator assembly according to claim 1 wherein said horizontal pivot means includes a first shaft attached at substantially a right angle to said shaft in said housing; a second shaft attached at substantially a right angle to said shaft in said housing and on the oppostie side thereof to said first shaft; a flange connected to said housing, said flange having a pair of openings; and helical spring means carried by said first and second shafts and extending through the openings in said flange for maintaining said horizontal pivot means in a predetermined horizontal position.

7. A fertilizer applicator assembly according to claim 6 wherein said vertical pivot means includes a first pair of spaced strap members one of which is pivotally attached at one end to said first shaft and the other of which is pivotally attached at one end to said second shaft; a second pair of spaced strap members one of which is pivotally attached to one of said first pair of strap members, said colter, and said injection knife and the other of which is pivotally attached to the other of said first pair of strap members, said colter, and said injection knife; a third pair of spaced strap members one of which is pivotly attached at one end to said shaft in said housing and the other of which is pivotally attached at one end to said shaft in said housing and both of which are connected at their other ends to said colter, said third pair of strap members being substantially parallel to said first pair of strap members; and a pair of flanges one of which is carried by one of said second pair of strap members and the other of which is carried by the other of said second pair of strap members and both of which are in engagement with said helical spring means for maintaining said injection knife and said colter in a predetermined vertical position.

8. A fertilizer applicator assembly for supplying fertilizer to the soil comprising in combination a disk-type rotatable colter for cutting a furrow in the soil; first means connected to said applicator assembly for attaching said applicator assembly to a fertilizer applicator vehicle; horizontal pivot means connected to said first means including spring means carried by said horizontal pivot means to engage said first means for maintaining said applicator assembly in a predetermined horizontal position; vertical pivot means connected to said horizontal pivot means and said colter for maintaining said applicator assembly in a predetermined vertical position; and an injection knife carried by said vertical pivot means for introducing fertilizer into the furrow formed by said colter.

References Cited by the Examiner
UNITED STATES PATENTS

| | | | |
|---|---|---|---|
| 1,136,172 | 4/1915 | Scott. | |
| 1,555,881 | 10/1925 | Schardt | 172—144 |
| 2,722,902 | 11/1955 | Hyatt | 111—7 |
| 3,237,577 | 3/1966 | Wilkins | 111—7 |

ABRAHAM G. STONE, *Primary Examiner.*

R. E. BAGWILL, *Assistant Examiner.*